Sept. 1, 1964
A. A. LACHANCE
3,147,021
GROCERY CART
Filed June 6, 1961
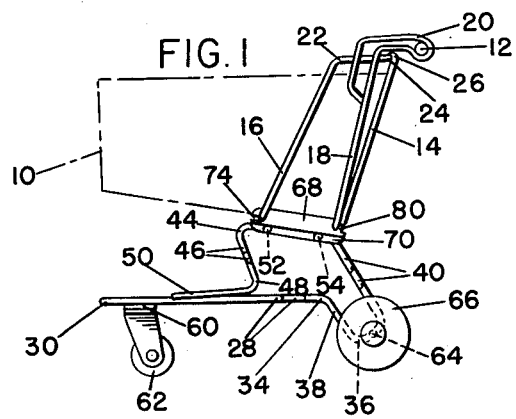
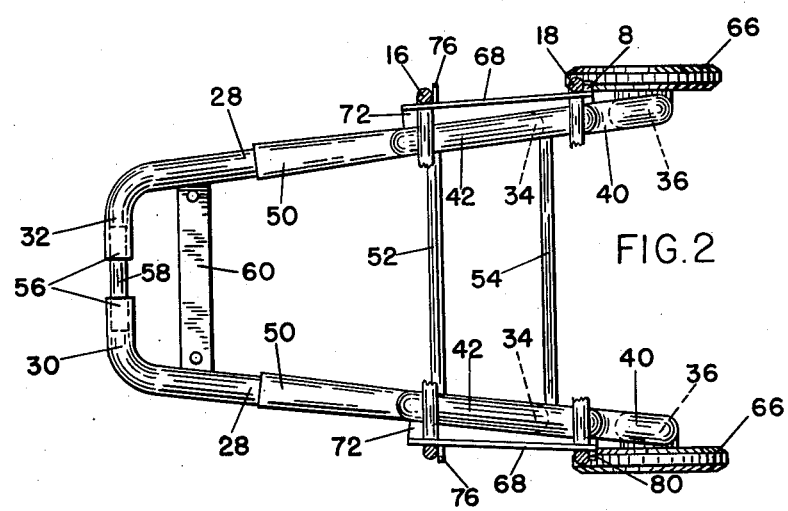
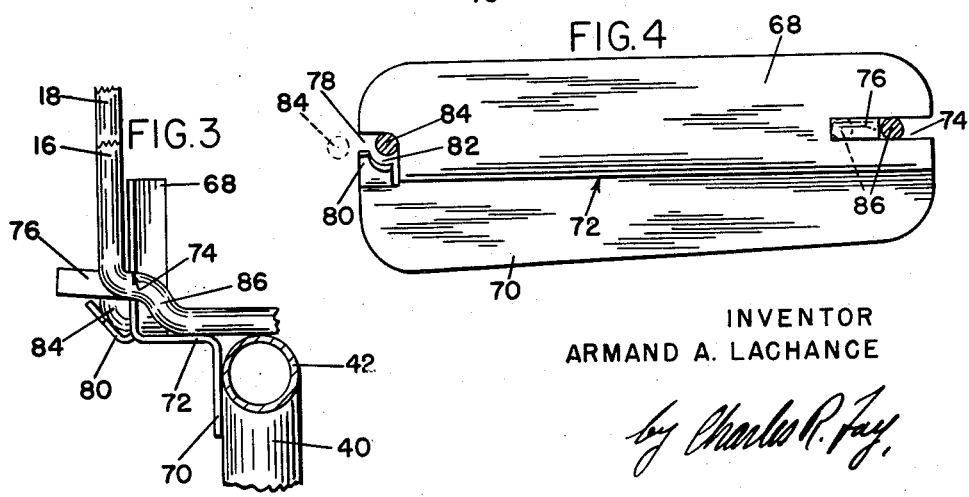
INVENTOR
ARMAND A. LACHANCE
ATTORNEY

United States Patent Office 3,147,021
Patented Sept. 1, 1964

3,147,021
GROCERY CART
Armand A. Lachance, North Oxford, Mass. (% American Metal Products Co., Southbridge St., Auburn, Mass.)
Filed June 6, 1961, Ser. No. 115,240
7 Claims. (Cl. 280—33.99)

This invention relates to a new and improved cart especially of the type known as grocery carts which are used by the customer for shopping in super markets and of course for any other desired or convenient purpose. The principal object of the present invention resides in the provision of a special new and improved rivet-less connection between the usual wire basket and the under carriage whereby the basket is attached as for instance at the factory merely by means of bending a set of tabs, the basket being detachable from the under carriage for replacement by bending the tabs once more to original position to free the basket. The invention also contemplates the provision of a special new and improved under carriage for grocery carts and the like, said under carriage being of a novel construction providing for the manufacture of carts of different widths through the use of the same under carriage side frame members, it only being necessary to utilize different lengths of spreader bars between the side frames for this purpose. The under carriage comprises two only side frame members which are made exactly alike except for the fact that at the extreme forward end thereof each side frame member is provided with a right or alternatively a left-hand bend and these bends at the forward part of the carriage may be connected as for instance by a telescopic member so that the side frame members may be spaced apart a distance as desired without the use of any different bends being made in the parts; but by means of utilizing different lengths of spreader bars, the side frame members may be spaced apart as desired in order to accommodate baskets of different widths, making it possible to store such frame parts in quantity and to immediately make use of the same without the necessity of having different sizes of frame members in order to manufacture carts of different widths. The side frame members are exactly alike except for the forward bends which can be made at any time so that the side frame members are made exactly alike and may be stored in this condition and only given the last bend when necessary to make rights and lefts for the respective carts.

Further objects of the invention reside in the provision of a new and improved under frame for grocery carts and the like providing a new and improved stronger and cheaper carriage particularly with respect to the outboard mounting of large rear wheels for the carriage which are mounted on single axles just at the closed end of a U-shaped bend in the frame, providing a much stronger construction for the mounting of these wheels. This also provides a stronger frame which is at the same time less expensive to manufacture and completely avoids the conventional U-shaped frames at the forward end of the carriage. This construction avoids the usual U-shaped or upright standards normally mounted on the under carriage and extending upwardly to support the basket, thus resulting in fewer parts for the under carriage which is as a consequence less expensive to manufacture, and also doing away with rivets, bolts and nuts, etc. which are ordinarily utilized in attaching the usual wire basket to the usual under frame of the grocery cart.

The invention further relates to arrangements and combinations of parts which will be hereinafter described and more particularly set forth in the appended claims.

Reference is to be had to the accompanying drawings, in which

FIG. 1 is a view in side elevation illustrating the invention;

FIG. 2 is a plan view of the under frame with the basket removed;

FIG. 3 is a sectional view on an enlarged scale illustrating a bracket connection with respect to the basket, and FIG. 4 is a view in elevation on an enlarged scale showing a bracket and in general the method of mounting the basket thereon.

In illustrating the invention, the reference numeral 10 indicates a basket which may be of any general size, shape or construction. This basket preferably is more or less similar to wire grocery cart baskets and it may be provided with a handle 12 for pushing the entire cart, a swinging gate member 14 similar to those well known in the art, and other usual constructional features. However, in this case there are a pair of wire members which are heavier than the usual wire members going to make up the basket and these wire members are generally upright, one being indicated at 16 and the other at 18. As shown in FIG. 1, the wire member 18 extends upwardly from the lowermost part of the basket 10 and is bent in such a way as to form a support for the handle 12 as is indicated by the loop at 20. The wire 16 also extends upwardly from the lowermost part of the basket 10 and extends toward the rear at its uppermost portion 22, terminating in an eye 24 for a hook 26 upon which the gate 14 is swingably mounted.

The under frame construction is best shown in FIGS. 1 and 2. This under frame comprises two main side frame which are secured together as will be hereinafter explained and which may be mounted a predetermined distance apart in order to carry baskets 10 of different widths. Also the construction of the under frame does away with the usual separate U-shaped upright members which have heretofore been necessary in the art to firmly support the basket 10 with the desired strength. Each side frame member includes an elongated side run 28 which extends forwardly at an angle relative to the longitudinal axis of the cart so that the under frame is seen to converge toward the front. At its forward end, each side member or run 28 is provided with an inward bend, these being indicated at 30 and 32 in FIG. 2, and it will be seen that the side run 28 which has the bend 32 is a right-hand side frame member and the side run with the inturned portion 30 is a lefthand side frame member. The frame members except for the bends 30 and 32 are identical.

The side runs 28 extends toward the rear and at the point 34 extend downwardly on an incline forming an upwardly inclined U-shaped member which is closed at its bottom portion at 36 and open at its upper portion. The portion of the run 38 forms one arm of the U, the other arm of the U extending upwardly as at 40 above the run 28 and then in a less sharply inclined run 42 upwardly and forwardly more or less determining the angle of the basket.

From the forward portion of the run 42, the side frame then extends downwardly as at 44 slightly to the rear on an incline as at 46 and then in a curve 48 forwardly to be flattened at 50 to blend into the curvature of the side runs 28. The terminal portion of the side frame at 50 can be welded to the run 28. In the neighborhood of the runs 42, 42 the side frames may be secured together by spreader bars 52, 54 and these bars of course can be of a length desired to correspond to the degree of separation of the ends at 56 of the bent portions 30 and 32 at the forward end of the carriage. These portions 30 and 32 are connected by a telescoping member 58 extending into the bends 30 and 32, being connected to the same to form a firm U-shaped front for the under carriage. Some other exterior telescoping member (not shown) may serve to conceal this joint if desired but it will be clear that the side frames may be made in quantity and stored, without forming the bends 30 and 32 so that the side frame members are exactly alike, and then when an assembly is to be made of a certain width of basket, the stored side frames may be bent to form the rights and lefts and connected together, being spaced apart the degree necessary for the particular width of basket under consideration. There is also a plate 60 which may be welded or otherwise connected to the side runs 28, 28 and then the front small wheels or casters 62 may be secured thereto as will be clear to those skilled in the art.

The downwardly projecting U-shaped member at 36, 38 is particularly useful to mount as at 64 large rear outboard wheels 66 on axles which pierce the member 36 at the lowermost portion thereof. This U-shaped construction for supporting the rear wheels is especially strong as it is a double member as compared with the usual single downwardly extending member of the prior art upon which the rear wheels were formerly mounted.

The runs at 40, 40 and 46, 46 provide an adequate support for the basket, doing away with the separate U-shaped frame members or standards ordinarily used in the prior art.

Each run at 42 is provided with a bracket in plate form as indicated at 68. This plate is elongated from front to rear of the run 42 and has a step-down portion 70 connected to the main bracket plate portion by a shelf-like member 72. The step-down portion 70 may be welded to the run 42 and extending outwardly therefrom forms therewith a support for the basket at the edges thereof.

Each bracket 68 is provided with a rearwardly extending forwardly opening slot 74, this slot being formed in part by removing and bending outwardly a tab 76 which is shorter than the slot. At its rear portion, the bracket 68 is notched at 78 as by punching out an angularly inlined tab 80 which has material removed at 82 to accommodate an inturned lower end portion 84 of the wire member 18.

It is to be noted that the wire members 16 and 18 are fixed in spaced relation and in order to mount the basket on the under frame it is merely necessary to arrange it substantially in the position desired, engaging the inturned portion 86 of the wire member 16 in the slot 74 and moving the basket rearwardly to a point where this inturned portion 86 assumes the dotted line position seen in FIG. 4. The portion at 84 of the member 18 is then in the dotted line position (see FIG. 4), and by bringing the entire basket forward the part 84 of the wire member 18 then lodges in the notch 78 where it is shown in solid lines in FIG. 4. The tab 76 is bent into notch 74, locating the wire member 86, and the tab 80 can then be bent up, which action clearly substantially surrounds the part 84 and holds it in position.

The basket can be removed for replacement in case of damage by bending tab 80 back outwardly say for instance to the FIG. 3 position, and then bending tab 76 back outwardly to its right angular position as shown in FIGS. 2 and 3. The basket can be slid to the rear where the respective wire portions assume the dotted line positions 84 and 86 in FIG. 4 and then the basket can be tilted down toward the front, so that the wire member 84 is no longer engaged with the bracket and the wire member at 86 may be slid forwardly, and then the basket is completely disengaged.

Having thus described my invention and the advantages thereof, I do not wish to be limited to the details herein disclosed, otherwise than as set forth in the claims, but what I claim is:

1. A cart comprising an under carriage, at least one bracket on the under carriage, said bracket having a pair of notches, a separable basket mounted on the bracket, said basket including at least two generally upright wire members spaced in a fore-and-aft direction, said bracket notches facing fore-and-aft, the forward one of said wire members being located in the forward notch, a tab on the bracket for bending down to contact the wire in the forward notch and maintain the same against motion in a rearward direction, said forward notch extending forwardly with respect to the bracket and also the cart, and another tab adjacent the rear notch of the bracket, said rear tab extending generally at right angles to the first-named tab for bending in a direction to contain the rearward wire member, said tabs being capable of being rebent to free the wire members from the notches and the basket from the bracket.

2. The cart of claim 1 including means on the bracket supporting the basket.

3. The cart of claim 1 including a like second bracket spaced from and parallel to the first bracket, said second bracket having like notches receiving the basket wire members.

4. A cart comprising an under carriage, at least one bracket on the under carriage, said bracket having a pair of notches, a separable basket mounted on the bracket, said basket including at least two generally upright wire members spaced in a fore-and-aft direction, said bracket notches facing fore-and-aft, the forward one of said wire members being located in the forward notch, a tab on the bracket for bending down to contact the wire in the forward notch and maintain the same against motion in a rearward direction, and another tab adjacent the rear notch of the bracket, said rear tab extending generally at an angle to the first-named tab for bending in a direction to contain the rearward wire member.

5. An under frame for a cart having a container which is adapted to be mounted on the under frame, said under frame comprising a pair of generally similar side frame members extending generally longitudinally of the cart, each side frame member comprising a substantial right angle portion at the forward end thereof, said right angle portions being connected, said side frame members extending in substantially straight runs from said right angle portions to the rear of the under frame and each including a U-shaped member the arms of which are spaced, the U-shaped member extending downwardly to the closed end thereof from the respective runs and opening generally upwardly on an incline toward the front of the cart, a wheel axle at the closed end of the U, said wheel axle extending outboard with relation to the under frame in fixed relation thereto, a wheel mounted on the axle in outboard relation to its respective frame member, said frame members extending forwardly in vertically upwardly spaced relation from the U-shaped members, and then extending forwardly and down, merging into the said runs of the frame members extending just to the rear of said right angle portions.

6. The under frame of claim 5 wherein said right angle portions of the side frames are respectively right and left and extend toward each other.

7. The under frame of claim 5 wherein said right angle portions of the side frames are respectively right and left and extend toward each other, and telescopic means engaging both of said right angle portions and connecting the same and means for covering the connection of the portions.

References Cited in the file of this patent

UNITED STATES PATENTS

| | | |
|---|---|---|
| D. 190,279 | Hummer | May 9, 1961 |
| 211,828 | Ash | Feb. 4, 1879 |
| 1,272,394 | Devney | July 16, 1918 |
| 2,556,532 | Goldman | June 12, 1951 |
| 2,571,456 | Kolln | Oct. 16, 1951 |
| 2,639,161 | Goldman | May 19, 1953 |
| 2,898,123 | Davis et al. | Aug. 4, 1959 |